United States Patent
Sugae et al.

(10) Patent No.: US 12,416,723 B2
(45) Date of Patent: Sep. 16, 2025

(54) DRIVE SUPPORT DEVICE

(71) Applicant: AISIN CORPORATION, Kariya (JP)

(72) Inventors: Ippei Sugae, Kariya (JP); Shingo Fujimoto, Kariya (JP); Kosuke Wakita, Kariya (JP); Hisashi Inaba, Kariya (JP)

(73) Assignee: AISIN CORPORATION, Kariya (JP)

( * ) Notice: Subject to any disclaimer, the term of this patent is extended or adjusted under 35 U.S.C. 154(b) by 634 days.

(21) Appl. No.: 17/202,654

(22) Filed: Mar. 16, 2021

(65) Prior Publication Data

US 2021/0389456 A1 Dec. 16, 2021

(30) Foreign Application Priority Data

Jun. 12, 2020 (JP) .................. 2020-102610

(51) Int. Cl.
- G01S 15/42 (2006.01)
- G01S 15/04 (2006.01)
- G01S 15/931 (2020.01)

(52) U.S. Cl.
CPC .............. G01S 15/42 (2013.01); G01S 15/04 (2013.01); G01S 15/931 (2013.01); G01S 2015/938 (2013.01)

(58) Field of Classification Search
None
See application file for complete search history.

(56) References Cited

U.S. PATENT DOCUMENTS

| | | | |
|---|---|---|---|
| 6,583,403 B1 | 6/2003 | Koike et al. | |
| 9,409,574 B2 | 8/2016 | Gokan et al. | |
| 2013/0038484 A1* | 2/2013 | Ohkado | G01S 13/46 342/70 |
| 2015/0219760 A1* | 8/2015 | Hiramaki | G01S 15/08 367/99 |
| 2015/0307091 A1 | 10/2015 | Gokan et al. | |
| 2016/0069990 A1 | 3/2016 | Harada et al. | |
| 2018/0259634 A1 | 9/2018 | Okamoto | |
| 2019/0370568 A1* | 12/2019 | Matsunaga | G01S 7/41 |
| 2020/0025868 A1* | 1/2020 | Trummer | G01S 7/026 |
| 2020/0057897 A1* | 2/2020 | Matsuura | G06V 20/58 |
| 2021/0018592 A1* | 1/2021 | Laghezza | G01S 13/46 |
| 2021/0088641 A1* | 3/2021 | Kirsch | G01S 15/931 |
| 2021/0190934 A1* | 6/2021 | Kondo | G01S 13/04 |

FOREIGN PATENT DOCUMENTS

| | | |
|---|---|---|
| JP | 2001-191876 A | 7/2001 |
| JP | 2014-74665 A | 4/2014 |
| JP | 6026948 B2 | 11/2016 |
| WO | 2014/083787 A1 | 6/2014 |
| WO | 2020/105166 A1 | 5/2020 |

* cited by examiner

Primary Examiner — Isam A Alsomiri
Assistant Examiner — Vikas Atmakuri
(74) Attorney, Agent, or Firm — Sughrue Mion, PLLC (57) ABSTRACT

A drive support device includes: an acquisition processing unit that acquires (i) a distance to an object detected based on a result of transmission of a transmission wave and reception of a reception wave that is the transmission wave having returned upon reflection by the object and (ii) a reception level of the reception wave used to detect the distance; and a detection processing unit that detects information about a height of the object, based on a relationship between the distance and the reception level that are acquired by the acquisition processing unit.

7 Claims, 8 Drawing Sheets

DRIVE SUPPORT DEVICE

CROSS REFERENCE TO RELATED APPLICATIONS

This application is based on and claims priority under 35 U.S.C. § 119 to Japanese Patent Application No. 2020-102610, filed on Jun. 12, 2020, the entire content of which is incorporated herein by reference.

TECHNICAL FIELD

The present disclosure relates to a drive support device.

BACKGROUND DISCUSSION

Conventionally, a technique to detect information about a height of an object located in the periphery of a vehicle has been studied. As such a technique, there is known a technic in which, for example, a plurality of ultrasonic sensors are installed at different height positions of a vehicle to detect information about a height of an object by transmission and reception of ultrasonic waves by the plurality of ultrasonic sensors (for example, Japanese Patent No. 6026948).

However, since the conventional art as described above requires a plurality of ultrasonic sensors to be installed at different height positions of a vehicle, degree of freedom in designing a vehicle is limited in some cases.

A need thus exists for a drive support device which is not susceptible to the drawback mentioned above.

SUMMARY

A drive support device that is an example of the present disclosure includes: an acquisition processing unit that acquires (i) a distance to an object detected based on a result of transmission of a transmission wave and reception of a reception wave that is the transmission wave having returned upon reflection by the object and (ii) a reception level of the reception wave used to detect the distance; and a detection processing unit that detects information about a height of the object, based on a relationship between the distance and the reception level that are acquired by the acquisition processing unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

In the following, embodiments and modified examples of the present disclosure will be described with reference to the drawings. The configurations of the embodiment and the modified examples described in the following and the actions and effects provided by the configurations are merely examples, and the present disclosure is not limited to the content described below.

First Embodiment

Figure 1:
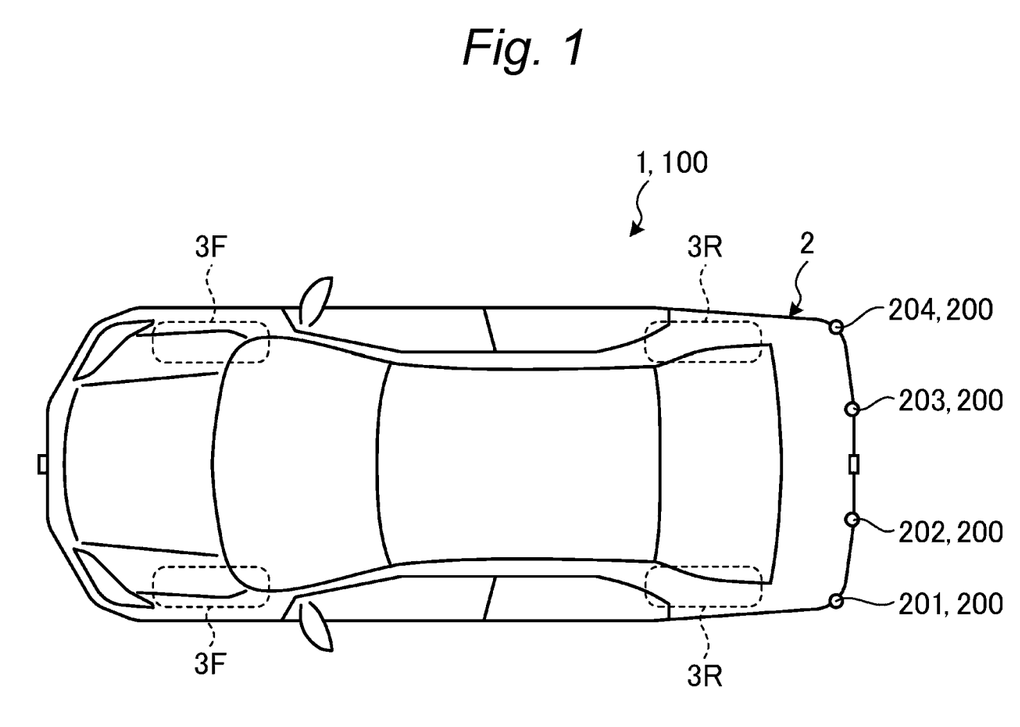
FIG. 1 is an exemplary schematic diagram showing an outer appearance of a vehicle including a drive support system according to a first embodiment as viewed from above.

FIG. 1 is an exemplary schematic diagram showing an outer appearance of a vehicle 1 including an object detection system according to a first embodiment as viewed from above.

As will be described in the following, a drive support system according to the first embodiment is a system that performs drive support for the vehicle 1 by using an on-vehicle sensor system (on-vehicle sonar) that detects information about an object (for example, an obstacle O to be described later in FIG. 2) located in the periphery of the vehicle 1.

More specifically, as shown in FIG. 1, the drive support system according to the embodiment includes: an electronic control unit (ECU) 100 serving as an on-vehicle controller; and distance detection devices 201 to 204 serving as the on-vehicle sonar. The ECU 100 is mounted inside the vehicle 1 having four wheels including a pair of front wheels 3F and a pair of rear wheels 3R, and the distance detection devices 201 to 204 are mounted on an exterior of the vehicle 1.

In the example shown in FIG. 1, as an example, the distance detection devices 201 to 204 are installed on a rear-end part (rear bumper) of a vehicle body 2, which is the exterior of the vehicle 1, at different positions along a width direction of the vehicle 1. However, the installation positions of the distance detection devices 201 to 204 are not limited to the example shown in FIG. 1. For example, the distance detection devices 201 to 204 may be installed on a front-end part (front bumper) of the vehicle body 2, may be installed on a side face part of the vehicle body 2, or may be installed on two or more of the rear-end part, the front-end part, and the side face parts.

Note that, in the embodiment, the distance detection devices 201 to 204 each have the same hardware configuration and function. Therefore, in the following, the distance detection devices 201 to 204 are sometimes generally referred to as object detection devices 200 for simplicity. In the embodiment, the number of the object detection devices 200 is not limited to four as shown in FIG. 1.

Figure 2:
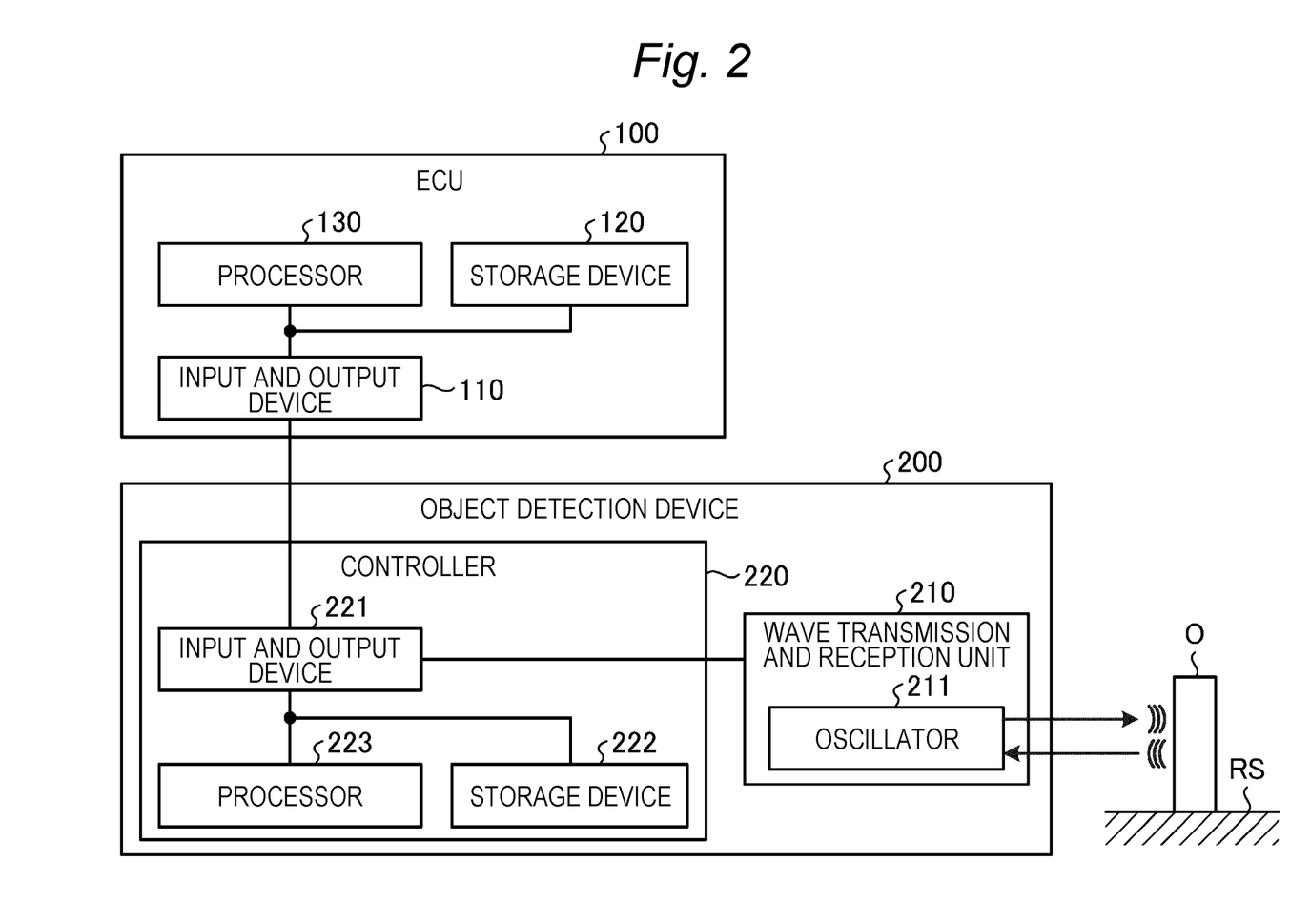
FIG. 2 is an exemplary schematic block diagram showing schematic hardware configurations of an electronic control unit (ECU) and a distance detection device that constitute the drive support system according to the first embodiment.

FIG. 2 is an exemplary schematic block diagram showing a hardware configuration of the ECU 100 and an object detection device 200 that constitute the drive support system according to the first embodiment.

As shown in FIG. 2, the ECU 100 includes a similar hardware configuration to a normal computer. More specifically, the ECU 100 includes an input and output device 110, a storage device 120, and a processor 130.

The input and output device 110 is an interface to realize transmission and reception of information between the ECU 100 and the outside (the object detection device 200 in the example in FIG. 1).

The storage device 120 includes a main storage device such as a read only memory (ROM) or a random access memory (RAM) and/or an auxiliary storage device such as a hard disk drive (HDD) or a solid state drive (SSD).

The processor 130 handles various types of processing to be performed on the ECU 100. The processor 130 includes an operation unit such as a central processing unit (CPU). The processor 130 realizes various functions such as automatic parking by reading out computer programs stored in the storage device 120 and executing the computer programs.

Further, as shown in FIG. 2, the object detection device 200 includes a wave transmission and reception unit 210 and a controller 220.

The wave transmission and reception unit 210 has an oscillator 211 configured with a piezoelectric element or the like and performs transmission and reception of an ultrasonic wave by using the oscillator 211.

More specifically, the wave transmission and reception unit 210 transmits as a transmission wave an ultrasonic wave generated in accordance with a vibration of the oscillator 211, and receives as a reception wave the vibration of the oscillator 211 caused by an ultrasonic wave that is transmitted as the transmission wave and returns after being reflected by an object located in the periphery of the vehicle 1. In the example shown in FIG. 2, an obstacle O placed on a road surface RS exemplifies an object that reflects the ultrasonic wave from the wave transmission and reception unit 210.

Note that, the example shown in FIG. 2 shows, as an example, a configuration in which both of transmission of a transmission wave and reception of a reception wave are realized by a single wave transmission and reception unit 210 having a single oscillator 211. However, the technique of the embodiment can be applied also to a configuration in which a component on a transmission side and a component on a reception side are separated, for example, a configuration in which a first oscillator for transmitting a transmission wave and a second oscillator for receiving a reception wave are separately provided.

The controller 220 includes a similar hardware configuration to a normal computer. More specifically, the controller 220 includes an input and output device 221, a storage device 222, and a processor 223.

The input and output device 221 is an interface to realize transmission and reception of information between the controller 220 and the outside (the ECU 100 and the wave transmission and reception unit 210 in the example shown in FIG. 1).

The storage device 222 includes main storage devices such as a ROM and a RAM and an auxiliary storage device such as an HDD or an SSD.

The processor 223 handles various types of processing to be performed on the controller 220. The processor 223 includes an operation unit such as a CPU. The processor 223 realizes various functions by reading out computer programs stored in the storage device 222 and executing the computer programs.

Here, the object detection device 200 according the embodiment detects a distance to an object by a technique that is the so-called time of flight (TOF) method. As will be described in detail in the following, the TOF method is a technique to calculate a distance to an object on the basis of a timing when a transmission wave is transmitted (more specifically, a transmission wave starts to be transmitted) and a timing when a reception wave is received (more specifically, a reception wave starts to be received) timing.

Figure 3:
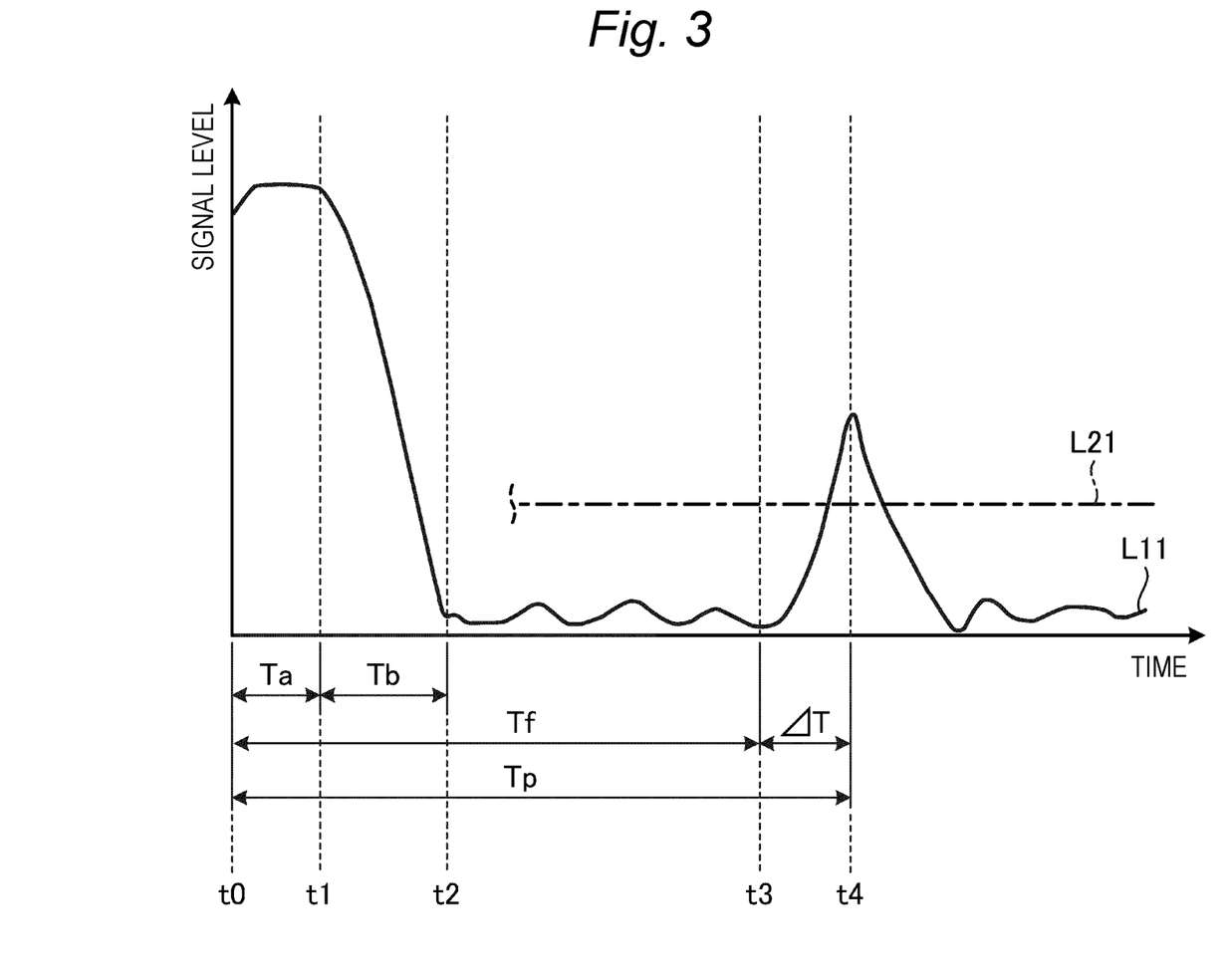
FIG. 3 is an exemplary schematic diagram for describing an overview of a technique used in the first embodiment to detect a distance to an object.

FIG. 3 is an exemplary schematic diagram for describing an overview of a technique used to detect a distance to an object in the first embodiment.

More specifically, FIG. 3 is a diagram that exemplarily and schematically shows, in a graph form, a temporal change in a signal level (for example, amplitude) of the ultrasonic wave transmitted and received by the object detection device 200 according to the first embodiment. In the graph shown in FIG. 3, the horizontal axis corresponds to time, and the vertical axis corresponds to the signal level of the signal that the object detection device 200 transmits and receives via the wave transmission and reception unit 210 (the oscillator 211).

In the graph shown in FIG. 3, the solid line L11 represents an example of the signal level of the signal transmitted and received by the object detection device 200, that is to say, an example of an envelope representing the temporal change of the degree of the vibration of the oscillator 211. From this solid line L11, it can be read that the oscillator 211 vibrates by being driven from the timing t0 for just a time Ta, the transmission of the transmission wave is therefore finished at the timing t1, and the vibration of the oscillator 211 then continues for the time Tb until the timing t2 by inertia while decaying. Therefore, in the graph shown in FIG. 3, the time Tb corresponds to a so-called reverberation time.

At the timing t4 when the time Tp has elapsed since the timing t0 when the transmission of the transmission wave is started, the solid line L11 reaches a peak in which the degree of the vibration of the oscillator 211 exceeds (or becomes greater than or equal to) the predetermined threshold Th1 represented by the dashed-dotted line L21. The threshold Th1 is a value previously set to identify whether the vibration of the oscillator 211 is caused by a the reception of the reception wave that is the transmission wave having returned after being reflected by a detection target object (for example, the obstacle O shown in FIG. 2) or is caused by the reception of the reception wave that is the transmission wave having returned after being reflected by an object other than a detection target object (for example, the road surface RS shown in FIG. 2).

Note that FIG. 3 shows an example in which the threshold Th1 is a constant value that does not change with a lapse of time; however, in the embodiment, the threshold Th1 may be set to a value that changes with a lapse of time.

Here, the vibration having a peak exceeding (or greater than or equal to) the threshold Th1 can be deemed to be caused by the reception of the reception wave that is the transmission wave having returned after reflected by the detection target object. On the other hand, the vibration having a peak less than or equal to (or less than) the threshold Th1 can be deemed to be caused by the reception of the reception wave that is the transmission wave having returned after reflected by the object other than the detection target object.

Therefore, it can be read from the solid line L11 that the vibration of the oscillator 211 at the timing t4 is caused by the reception of the reception wave that is the transmission wave having returned after being reflected by the detection target object.

Note that, with reference to the solid line L11, the vibration of the oscillator 211 decays at or after the timing t4. Therefore, the timing t4 corresponds to the timing of completion of reception of the reception wave that is the transmission wave having returned after being reflected by the detection target object, in other words, corresponds to the timing when the transmission wave lastly transmitted at the timing t1 returns as a reception wave.

Further, with reference to the solid line L11, the timing t3, which is the starting point of the peak at the timing t4, corresponds to the timing of start of reception of the reception wave that is the transmission wave having returned after being reflected by the detection target object, in other words, corresponds to the timing when the transmission wave transmitted first at the timing t0 returns as a reception wave. Therefore, with reference to the solid line L11, the time ΔT between the timing t3 and the timing t4 is equal to the time Ta, which is a transmission time of the transmission wave.

Considering the above description, to calculate the distance to the detection target object by the TOF method, it is necessary to obtain the time Tf between the timing t0 when the transmission wave starts to be transmitted and the timing t3 when the reception wave starts to be received. The time Tf can be calculated by subtracting the time ΔT from the time Tp, where the time Tp is the difference between the timing t0 and the timing t4 when the signal level of the reception wave reaches the peak exceeding the threshold Th1, and the time ΔT is equal to the time Ta, which is the transmission time of the transmission wave.

The timing t0, at which the transmission wave starts to be transmitted, can be easily specified as the timing when the object detection device 200 starts to operate, and the time Ta, which is the transmission time of the transmission wave, is previously determined by setting or the like. As a result, to calculate the distance to the detection target object by the TOF method, it is therefore important to identify the timing t4, at which the signal level of the reception wave reaches the peak exceeding the threshold Th1.

By the way, techniques have been conventionally studied to detect information about not only the distance to an object located in the periphery of the vehicle 1 but also the height of the object. As one of such techniques, there is known a technique in which, for example, a plurality of ultrasonic sensors are installed at different height positions of the vehicle 1 to detect information about a height of an object by the plurality of ultrasonic sensors transmitting and receiving ultrasonic waves.

However, since the conventional art as described above requires a plurality of ultrasonic sensors to be installed at different height positions of the vehicle 1, the degree of freedom in designing the vehicle 1 is limited in some cases.

To address this issue, the embodiment achieves to detect information about the height of an object without impairing the degree of freedom in designing a vehicle, by focusing on the feature to be described in the following.

Figure 4:
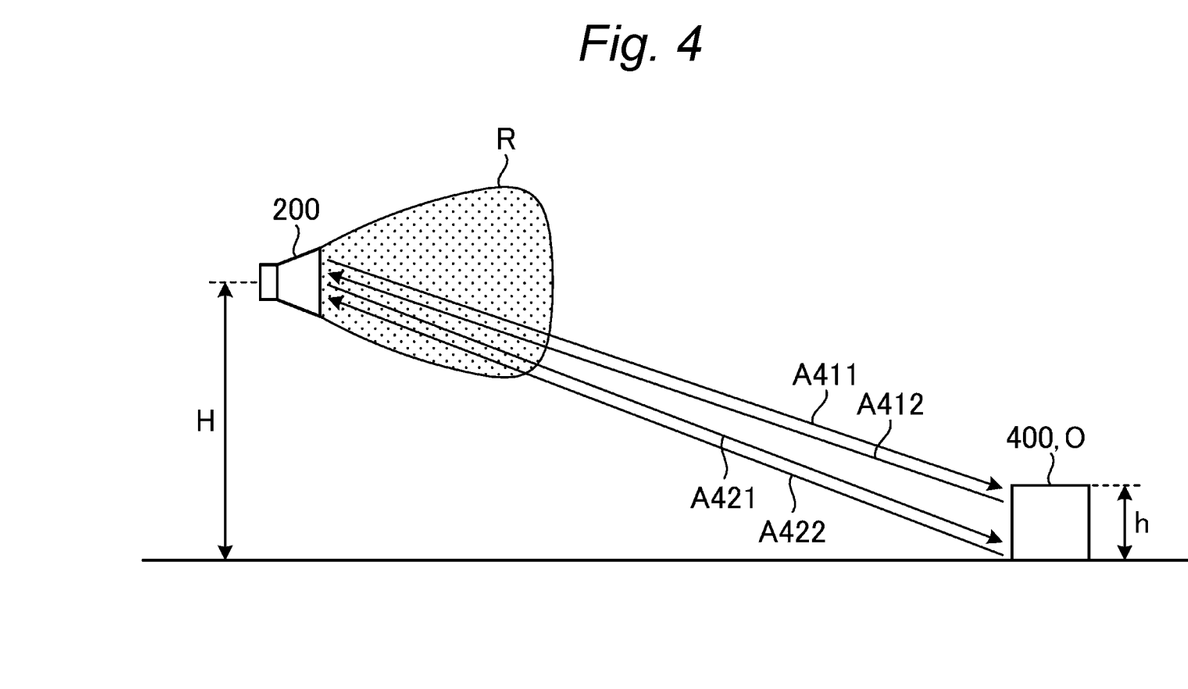
FIG. 4 is an exemplary schematic diagram for describing a feature to be focused on to detect information about a height of the object in the first embodiment.

FIG. 4 is an exemplary schematic diagram for describing the feature to be focused on to detect information about the height of the object in the first embodiment.

FIG. 4 shows two examples of paths for transmission and reception of ultrasonic waves that can be constituted between the object detection device 200 installed at a height H and an object 400 (the obstacle O) having a height h (<H) Note that, in the example shown in FIG. 4, the shadowed region R corresponds to a range of directivity of the ultrasonic wave to be transmitted and received by the object detection device 200.

As shown in FIG. 4, a flight distance of the ultrasonic wave transmitted and received between the object detection device 200 and the object 400 depends on the position at which reflection occurs on the object 400. For example, in the example shown in FIG. 4, there is a difference between the lengths of the following two paths: the path along which the ultrasonic wave flies from the object detection device 200 to the object 400 along the arrow A411 and then returns to the object detection device 200 along the arrow A412 after being reflected by the object 400; and the path along which the ultrasonic wave flies from the object detection device 200 to the object 400 along the arrow A421 and then returns to the object detection device 200 along the arrow A422 after being reflected by the object 400.

Here, the distances of a plurality of paths constituted between the object detection device 200 and the object 400 depend on the distance between the object detection device 200 and the object 400; therefore, when the object detection device 200 and the object 400 are sufficiently apart from each other, it is possible to ignore the differences among the lengths of the paths constituted between the object detection device 200 and the object 400. Therefore, in this case, the relationship between (i) the distance between the object detection device 200 and the object 400 and (ii) a reception level that is the signal level of the reception wave having returned to the object detection device 200 after being reflected by the object 400 is substantially the same among a plurality of paths. Note that, not shown in the drawing, a similar relationship can be obtained even in a situation where the height h of the object 400 is greater than the height H of the object detection device 200.

However, when the object detection device 200 and the object 400 get closer to each other to a certain extent, the difference in length among a plurality of paths constituted between the object detection device 200 and the object 400 cannot be ignored. Therefore, in this case, the relationship between (i) the distance between the object detection device 200 and the object 400 and (ii) the reception level that is the signal level of the reception wave having returned to the object detection device 200 after being reflected by the object 400 has variation among a plurality of paths. Note that, not shown in the drawing, a similar relationship can be obtained even in a situation where the height h of the object 400 is greater than the height H of the object detection device 200.

Here, as shown in FIG. 4, in a situation where the height h of the object 400 is smaller than the height H of the object detection device 200, when the object detection device 200 and the object 400 get close to each other to a certain extent or get even closer, the object 400 is accordingly getting out of the range R of the directivity of the ultrasonic wave. Therefore, in this case, the reception level that is the signal level of the reception wave having returned to the object detection device 200 after being reflected by the object 400 becomes gradually lower.

On the other hand, not shown in the drawing, in a situation where the height h of the object 400 is greater than the height H of the object detection device 200, even when the object detection device 200 and the object 400 get close to each other to a certain extent or get even closer, the object 400 does not get accordingly out of the range R of the directivity of the ultrasonic wave. Therefore, in this case, the reception level that is the signal level of the reception wave having returned to the object detection device 200 after being reflected by the object 400 becomes gradually higher.

Figure 5:
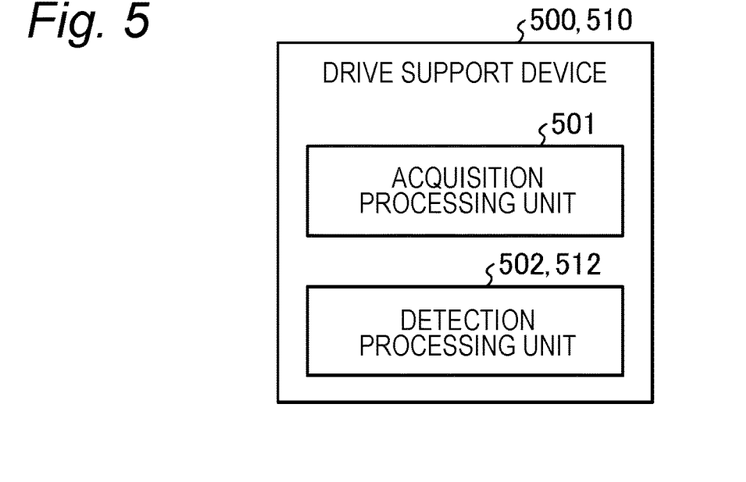
FIG. 5 is an exemplary schematic block diagram showing a function of a drive support device according to the first embodiment.

Considering the feature as described above, the first embodiment detects the height of an object located in the periphery of the vehicle 1 by realizing a drive support device 500 as shown in FIG. 5 by using the ECU 100.

FIG. 5 is an exemplary schematic block diagram showing a function of the drive support device 500 according to the first embodiment.

As shown in FIG. 5, the drive support device 500 according to the first embodiment includes an acquisition processing unit 501 and a detection processing unit 502.

Note that, in the first embodiment, the configuration shown in FIG. 5 is realized as a result of cooperation between hardware and software, more specifically, as a result of an operation that the processor 130 of the ECU 100 reads out a predetermined computer program (a drive support program or a height detection program) from the storage device 120 and executes the predetermined computer program. However, in the first embodiment, at least part of the configuration shown in FIG. 5 may be realized only by dedicated hardware (circuitry).

The acquisition processing unit 501 acquires a detection result of the object detection device 200. More specifically, the acquisition processing unit 501 acquires from the object detection device 200 (i) the distance to an object detected by the above-described TOF method on the basis of the result of the transmission of the transmission wave and the reception of the transmission wave that is the transmission wave having returned upon reflection by the object and (ii) the reception level of the reception wave used to detect the distance.

Then, the detection processing unit 502 detects the information about the height of the object on the basis of the feature described above with reference to FIG. 4. That is, the detection processing unit 502 detects the information about the height of the object on the basis of a relationship between the distance and the reception level acquired by the acquisition processing unit 501.

Figure 6:
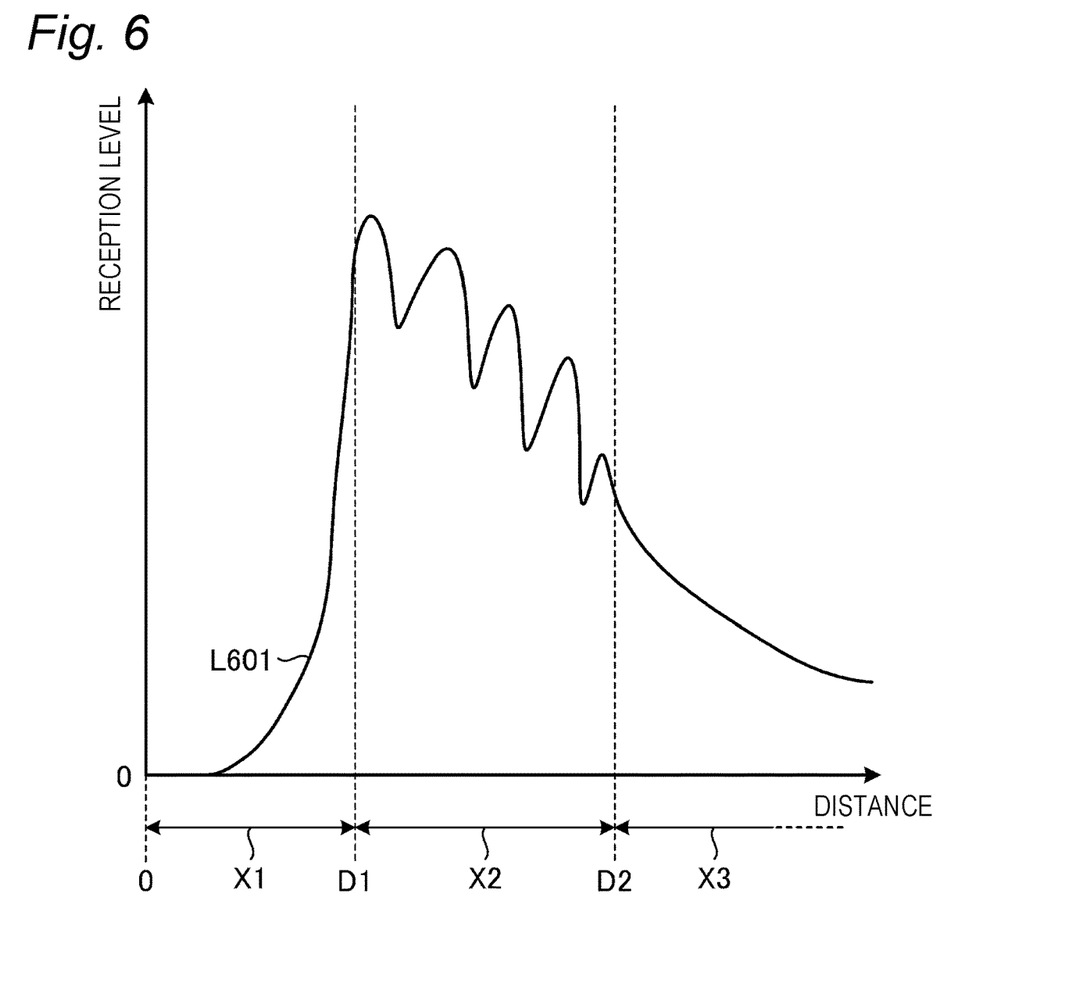
FIG. 6 is an exemplary schematic diagram showing a relationship between the distance to the object and a reception level of a reception wave according to the first embodiment.

The relationship between the distance to the object and the reception level of the reception wave acquired by the acquisition processing unit 501 can be represented, for example, by the graph shown in the next FIG. 6.

FIG. 6 is an exemplary schematic diagram showing the relationship between the distance to the object and the reception level of the reception wave according to the first embodiment.

More specifically, FIG. 6 shows, by a graph of the solid line L601, the change in the reception level in accordance with the change in the distance to the object under the situation shown in FIG. 4, that is, the situation where the height h of the object is smaller than the height H of the object detection device 200. In the graph shown in FIG. 6, the horizontal axis corresponds to the distance to the object, and the vertical axis corresponds to the reception level.

As already described with reference to FIG. 4, in the situation where the height h of the object is smaller than the height of the object detection device 200, the relationship between the distance to the object and the reception level of the reception wave shows different features among the following cases: the case where the object detection device 200 and the object are sufficiently apart from each other; the case where the object detection device 200 and the object are close to each other to a certain extent; and the case where the object detection device 200 and the object are even closer to each other.

For example, in the example shown in FIG. 6, the case where the object detection device 200 and the object are sufficiently apart from each other is exemplified by the section X3 where the distance is greater than D2 on the horizontal axis; the case where the object detection device 200 and the object are close to each other to a certain extent is exemplified by the section X2 where the distance on the horizontal axis is greater than or equal to D1 and less than or equal to D2; and the case where the object detection device 200 and the object are even closer to each other is exemplified by the section X1 where the distance on the horizontal axis is greater than or equal to 0 and less than D1.

Here, the example shown in FIG. 6 corresponds to the situation where the height h of the object is smaller than the height H of the object detection device 200. Therefore, in the example shown in FIG. 6, in the section X1 where the object gets further out of the range of the directivity of the ultrasonic wave as the object and the object detection device 200 gets closer to each other, the reception level on the vertical axis becomes lower as the distance on the horizontal axis becomes smaller.

On the other hand, as described above, in the case where the height h of the object 400 is greater than the height H of the object detection device 200, even when the object and the object detection device 200 gets closer to each other, the object does not get out of the range of the directivity of the ultrasonic wave. Therefore, in this case, also in a section corresponding to the section X1 shown in FIG. 6, the reception level on the vertical axis becomes greater in the same manner as in sections corresponding to the sections X2 and X3 as the distance on the horizontal axis becomes smaller (not shown in the drawing).

Therefore, in the case where the distance between the vehicle 1 and the object moves in the order of the sections X3, X2, and X1 shown in FIG. 6 with the vehicle 1 and the object getting closer to each other, when the situation comes to a stage where the distance between the vehicle 1 and the object has come into the section X1, a magnitude relation between the height h of the object and the height H of the object detection device 200 can be easily detected.

However, in the first embodiment, it is desirable if information about the height h of the object can be detected in a stage earlier than the stage of the section X1.

Therefore, in the example shown in FIG. 6, the first embodiment focuses on the section X2, where the distance on the horizontal axis is greater than or equal to D1 and less than or equal to D2. The section X2 shows a feature that a degree of fluctuation in the reception level on the vertical axis is greater. Further, a magnitude of the reception level on the vertical axis depends on the height h of the object.

Considering the above description, the first embodiment monitors the relationship, as shown in FIG. 6, between the distance to the object and the reception level of the reception wave and thus detects a point at which the degree of fluctuation in the reception level with respect to the distance starts to exceed the threshold. With this operation, the first embodiment detects a presence or absence of an object having a height h smaller than the height H of the object detection device 200 on a stage earlier than the stage of the section X1, specifically, on the stage of the section X2.

Further, the first embodiment previously sets a map (table) or the like showing a correspondence relation between the reception level when the degree of fluctuation starts to exceed the threshold and the height h of the object, and detects the height h of the object on the basis of the magnitude of the reception level when the variation starts to exceed the threshold.

As described above, in the first embodiment, the detection processing unit 502 detects the information about the height h of the object by using the degree of fluctuation, in the reception level, depending on the change in the distance. More specifically, the detection processing unit 502 detects a value representing the height of the object depending on the reception level when the degree of fluctuation in the reception level starts to exceed the threshold in response to a decrease in the distance.

By the way, if it is possible to perform transmission and reception of ultrasonic waves and detection of the distances with a single object detection device 200 at short time intervals, it is possible to obtain the detailed relationship between distance and reception level as shown in FIG. 6 only by using the detection results of the single object detection device 200. However, depending on the performance of the object detection device 200, it is sometimes impossible to perform transmission and reception of ultrasonic waves and detection of the distances with a single object detection device 200 at short time intervals. In this case, it can be thought that it is only possible to obtain the relationship between distance and reception level constituted by a group of dots that are more sparsely located than in the example in FIG. 6 because the number of the obtained detection results is fewer, and it is therefore impossible to detect the variation in the reception level with high accuracy.

Therefore, the first embodiment achieves to obtain a detailed relationship, as shown in FIG. 6, between distance and reception level by substantially simultaneously transmitting transmission waves from a plurality of object detection devices 200 so that the greater number of detection results can be obtained. In this case, to enable the plurality of ultrasonic waves transmitted and received by the plurality of object detection devices 200 to be identified from each other, the plurality of ultrasonic waves are encoded to have identification information different from each other. As the method for the encoding, it is possible to use various methods such as a phase-modulation method, a frequency-modulation method, and a combination of these methods.

Note that, in the first embodiment, in the case where the detection processing unit 502 obtains the relationship between distance and reception level by substantially simultaneously transmitting transmission waves from the plurality of object detection devices 200, it is possible to use the variation with respect to a plurality of reception levels obtained from the plurality of object detection devices 200 as the variation used as an index to be used to detect the height h of the object. At this time, the detection processing unit 502 may correct the plurality of reception levels, depending on the differences in the installation positions of the object detection devices 200 in the width direction of the vehicle 1.

On the other hand, in the first embodiment, in the case where the detection processing unit 502 obtains the relationship between distance and reception level by using the detection result of a single object detection device 200, it is possible to use the variation with respect to a moving average of the reception level obtained by the single object detection device 200 as the variation used as the index to be used to detect the height h of the object.

By the method as described above, the detection processing unit 502 according to the first embodiment detects the information about the height h of the object. Then, in the first embodiment, the information about the height h detected by the detection processing unit 502 can be used for drive support of the vehicle 1.

For example, in the case where the height h of the object detected by the detection processing unit 502 is smaller than the height H of the object detection device 200, the object can be determined to be an object such as a wheel stopper that is less likely to come into contact with the vehicle body 2. On the other hand, in the case where the height h of the object detected by the detection processing unit 502 is greater than the height H of the object detection device 200, the object can be determined to be an object such as a wall or a pillar that is highly likely to come into contact with the vehicle body 2.

Therefore, the height h of the object detected by the detection processing unit 502 can be used to evaluate the possibility of contact between the vehicle body 2 and the object when automatic parking is performed as an example of the drive support. Therefore, in the first embodiment, the detection processing unit 502 outputs the detection result of the information about the height h of the object to a function mounted on the vehicle 1 that handles automatic parking. The function handling the automatic parking may be realized by the ECU 100 realizing the drive support device 500 or may be realized by another ECU.

Note that it goes without saying that, in the first embodiment, the detection result of the information about the height h of the object can be used for drive support other than the automatic parking (for example, automatic unparking).

Figure 7:
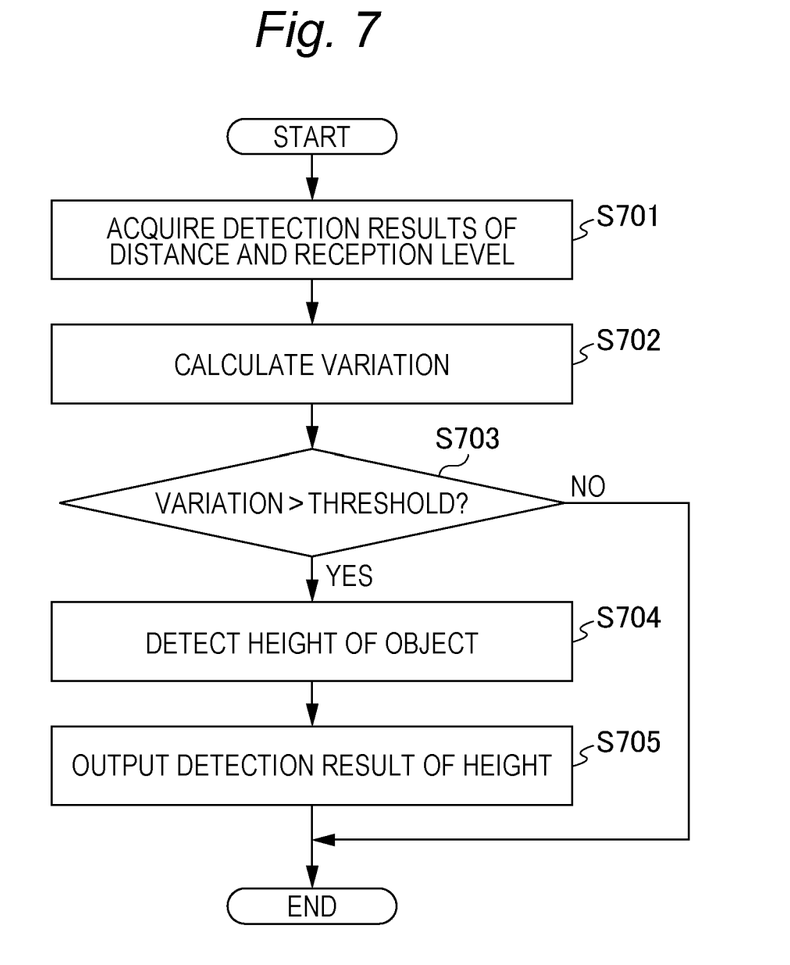
FIG. 7 is an exemplary flowchart showing an example of a process performed in the first embodiment to detect information about the height of the object.

On the basis of the above configuration, the drive support device 500 according to the first embodiment performs a process as shown in the next FIG. 7. The series of processes shown in FIG. 7 are repeatedly performed, for example, at a predetermined control cycle.

FIG. 7 is an exemplary schematic flowchart showing processes performed in the first embodiment to detect the information about the height h of the object.

As shown in FIG. 7, in the first embodiment, first in step S701, the acquisition processing unit 501 of the drive support device 500 acquires the detection result by the object detection device 200, more specifically, acquires the distance to the object and the detection result of the reception level of the reception wave used to detect the distance.

Then, in step S702, the detection processing unit 502 of the drive support device 500 calculates the variation in the reception level on the basis of the relationship between the distance and the reception level acquired in step S701.

Then, in step S703, the detection processing unit 502 determines whether the variation calculated in step S702 exceeds the threshold.

In step S703, if it is determined that the variation does not exceed the threshold, there is obtained no grounds for detecting the height h of the object. Therefore, the process ends without doing anything.

On the other hand, if it is determined in step S703 that the variation exceeds the threshold, the grounds for detecting the height h of the object are obtained. In this case, the process therefore proceeds to the next step S704.

In step S704, the detection processing unit 502 detects the height h of the object on the basis of the reception level when the variation starts to exceed the threshold (for example, the reception level corresponding to the distance D2 shown in FIG. 6). In this case, for example, a previously set map or the like can be used as data representing a correspondence relation between the reception level when the variation starts to exceed the threshold and the height h of the object.

Then in step S705, the detection processing unit 502 outputs the detection result of the height h detected in step S704 to, for example, the function mounted on the vehicle 1 that handles automatic parking. With this arrangement, the automatic parking of the vehicle 1 is performed in an appropriate aspect, depending on the height h of the object. Then, the process ends.

As described above, the drive support device 500 according to the first embodiment includes the acquisition processing unit 501 and the detection processing unit 502. The acquisition processing unit 501 acquires from the object detection device 200 (i) the distance to the object detected on the basis of the result of the transmission of the transmission wave and the reception of the transmission wave that is the transmission wave having returned upon reflection by the object and (ii) the reception level of the reception wave used to detect the distance. Then, the detection processing unit 502 detects the information about the height h of the object on the basis of the relationship between the distance and the reception level acquired by the acquisition processing unit 501.

With the configuration as described above, it is possible to detect the information about the height h of the object on the basis of the relationship between the distance to the object and the reception level of the reception wave regardless of a position at which the transmission wave and the reception wave are transmitted or received. This makes it possible to detect the information about the height h of the object without impairing the degree of freedom in designing the vehicle 1.

More specifically, in the first embodiment, the detection processing unit 502 detects the information about the height h of the object by using as the above relationship the degree of fluctuation, in the reception level, depending on the change in the distance. With such a configuration, it is possible to easily detect the information about the height h of the object on the basis of the degree of fluctuation in the reception level.

In more detail, in the first embodiment, the detection processing unit 502 detects, as the information about the height h of the object, a value representing the height h of the object, depending on the reception level when the degree of fluctuation in the reception level starts to exceed the threshold in response to a decrease in the distance. With such a configuration, it is possible to easily detect the value representing the height h of the object only by identifying the reception level when the degree of fluctuation in the reception level starts to exceed the threshold.

Further, in the first embodiment, the distance acquired by the acquisition processing unit 501 can include a plurality of distances to the object detected on the basis of results of substantially simultaneous transmission of a plurality of transmission waves and on reception of a plurality of reception waves that are the plurality of transmission waves having returned upon reflection by the object, and at the same time, the reception level acquired by the acquisition processing unit 501 may include a plurality of reception levels of a plurality of reception waves each used to detect one of the plurality of distances. Then, the detection processing unit 502 uses as the above degree of fluctuation the variation with respect to an average value of the plurality of reception levels for each of the plurality of distances. With such a configuration, by obtaining greater number of detection results, it is possible to obtain in more detail the relationship between the distance to the object and the reception level of the reception wave. This makes it to improve the accuracy of the detection of the information about the height h of the object. Further, the variation in the reception level can be easily calculated.

Second Embodiment

Note that, in the above-mentioned first embodiment, there is described the configuration in which the information about the height h of the object is detected by detecting when the reception level starts to vary. However, as a second embodiment, there can be considered a configuration in which the information about the height h of the object can be detected before the reception level starts to vary.

Note that the second embodiment has the same basic hardware configuration and function as the first embodiment, and the only difference from the first embodiment is the way the information about the height h of the object is detected. That is, a drive support device 510 according to the second embodiment is realized similarly to the first embodiment except that the drive support device 510 includes, as a function to detect the information about the height h of the object, a detection processing unit 512 (see FIG. 5) instead of the detection processing unit 502 according to the first embodiment.

The method performed in the second embodiment to detect the height h of the object is the same as the method performed in the first embodiment, in a rough technical idea in which the relationship between the distance and the reception level acquired by the acquisition processing unit 501 is used. However, in the second embodiment, as will be described in the following, it is different from the first embodiment how to use the relationship between the distance and the reception level acquired by the acquisition processing unit 501.

Figure 8:
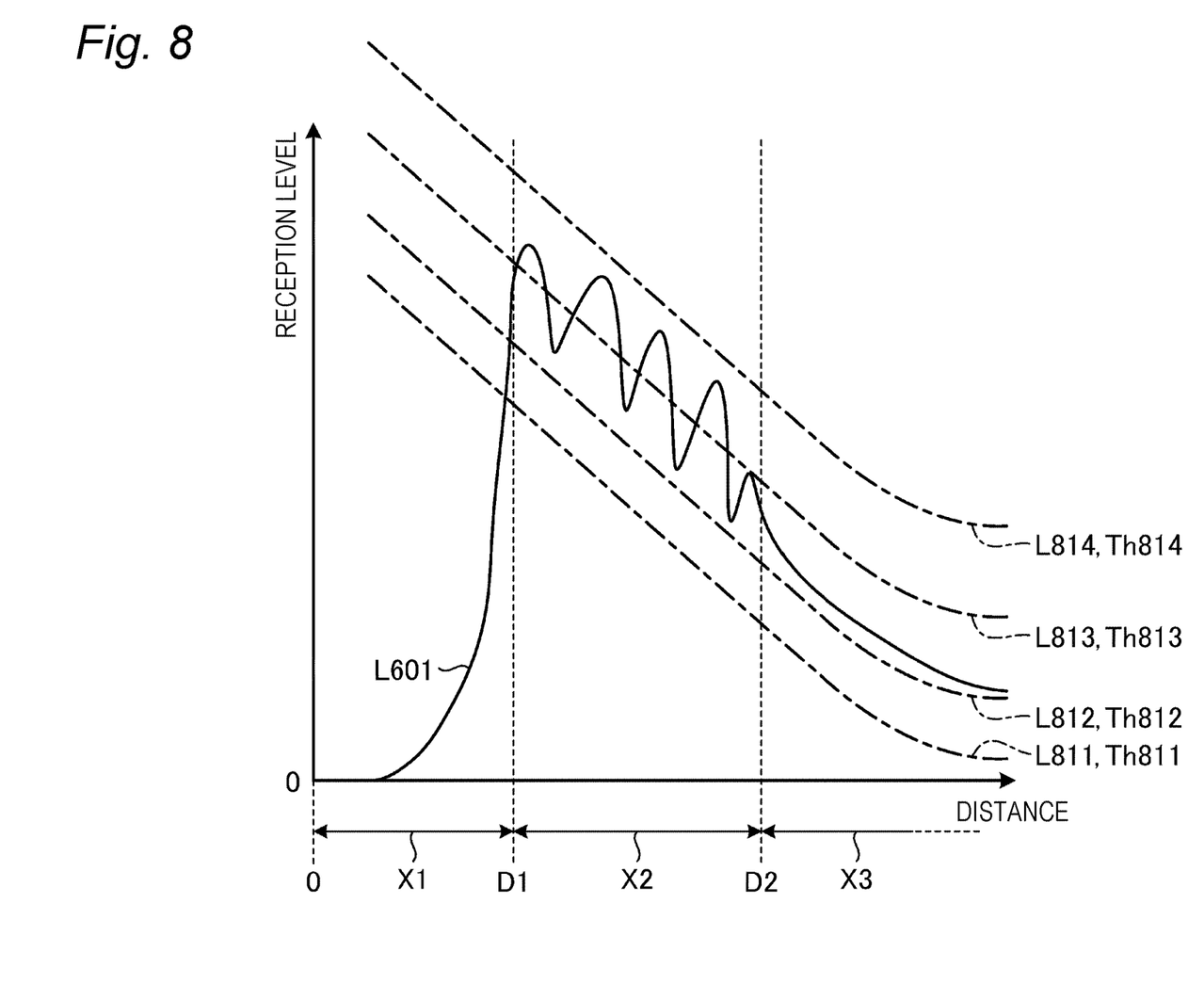
FIG. 8 is an exemplary schematic diagram for describing an overview of a method used in a second embodiment to detect information of a height of an object.

FIG. 8 is an exemplary schematic diagram for describing an overview of the method used in the second embodiment to detect the information about the height h of the object.

As shown in FIG. 8, also in the second embodiment, a relationship similar to the relationship in the first embodiment is obtained as the relationship between the distance and the reception level acquired by the acquisition processing unit 501 (see FIG. 6). Since the first embodiment uses the method in which the height h of the object is detected by focusing on a boundary between the sections X2 and X3 as a point at which the reception level starts to vary, it is basically impossible to detect the distance h of the object until the distance to the object becomes less than or equal to the distance D2.

However, also in the stage of the section X3, where the reception level does not start to vary yet, the magnitude of the reception level depends on the height h of the object. Therefore, the second embodiment detects the information about the height h of the object on the basis of a comparison result between (i) the relationship between the distance and the reception level acquired by the acquisition processing unit 501 and (ii) a predetermined relationship between distance and reception level that is previously set in correspondence to a value representing the height h of the object.

That is, in the example shown in FIG. 8, the four relationships represented by the dashed-dotted lines L811, L812, L813, and L814 are previously set as the predetermined relationship to be compared with the relationship between the distance and the reception level acquired by the acquisition processing unit 501.

For example, in the example shown in FIG. 8, the dashed-dotted line L811 corresponds to a predetermined relationship previously set through experiments or the like in correspondence to a case where the height h of the object is in a first range where the height h is less than or equal to h1 (>0), and the dashed-dotted line L812 corresponds to a predetermined relationship previously set through experiments or the like in correspondence to a case where the height h of the object is in a second range where the height h is greater than h1 and less than or equal to h2. Further, the dashed-dotted line L813 corresponds to a predetermined relationship previously set through experiments or the like in correspondence to a case where the height h of the object is in a third range where the height h is greater than h2 and less than or equal to h3, and the dashed-dotted line L814 corresponds to a predetermined relationship previously set through experiments or the like in correspondence to a case where the height h of the object is in a fourth range where the height h is greater than h3 and less than or equal to h4. Note that, in second embodiment, in addition to the relationships represented by the dashed-dotted lines L811 to L814, it is possible to previously set one or more other relationships where the height h of the object is greater than h4.

In the example shown in FIG. 8, the dashed-dotted line L811 can be used as a threshold Th811 to determine whether the height h of the object is in the above first range. Specifically, in the example shown in FIG. 8, when the relationship between the distance and the reception level acquired by the acquisition processing unit 501 (see the solid line L601) is located on the side where the reception level is smaller than the dashed-dotted line L811, the height h of the object can be determined to be in the first range.

Similarly, the dashed-dotted line L812 can be used as a threshold Th812 to determine whether the height h of the object is in the above second range. Specifically, in the example shown in FIG. 8, when the relationship between the distance and the reception level acquired by the acquisition processing unit 501 (see the solid line L601) is located on the side where the reception level is greater than the dashed-dotted line L811 and is located on the side where the reception level is smaller than the dashed-dotted line L812, the height h of the object can be determined to be in the second range.

Further, the dashed-dotted line L813 can be used as a threshold Th813 to determine whether the height h of the object is in the above third range. Specifically, in the example shown in FIG. 8, when the relationship between the distance and the reception level acquired by the acquisition processing unit 501 (see the solid line L601) is located on the side where the reception level is greater than the dashed-dotted line L812 and is located on the side where the reception level is smaller than the dashed-dotted line L813, the height h of the object can be determined to be in the third range.

Further, the dashed-dotted line L814 can be used as a threshold Th814 to determine whether the height h of the object is in the above fourth range. Specifically, in the example shown in FIG. 8, when the relationship between the distance and the reception level acquired by the acquisition processing unit 501 (see the solid line L601) is located on the side where the reception level is greater than the dashed-dotted line L813 and is located on the side where the reception level is smaller than the dashed-dotted line L814, the height h of the object can be determined to be in the fourth range.

The comparison between the solid line L601 and the dashed-dotted lines L811 to L814 can be performed also in the section X3, where the reception level does not start to vary does not start to vary yet. Therefore, with the second embodiment, it is possible to detect the information about the height h of the object before the reception level starts to vary.

Figure 9:
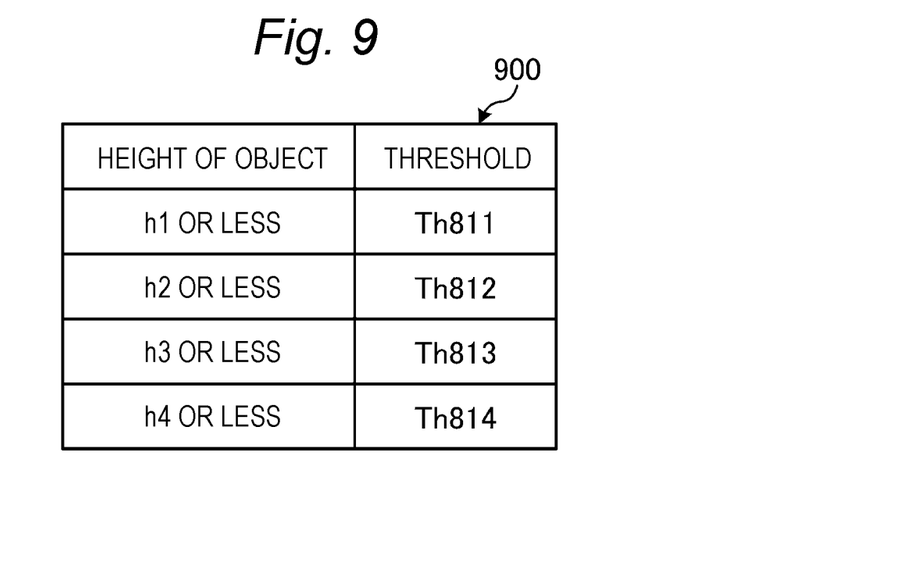
FIG. 9 is an exemplary schematic diagram showing an example of a map (table) showing set information according to the second embodiment.

The dashed-dotted lines L811 to L814 serving as the above-mentioned set information are previously stored in the storage device 120 (see FIG. 1) as a map (table) 900 shown in the next FIG. 9.

FIG. 9 is an exemplary schematic diagram showing an example of the map (table) 900 showing the set information according to the second embodiment.

As shown in FIG. 9, in the second embodiment, there is previously set a correspondence relation as the set information, and the correspondence relation is a relationship between (i) a plurality of ranges (the above-mentioned first to fourth ranges) to which the height h of the object can belong and (ii) thresholds (the above-mentioned thresholds Th811 to Th814) to be used to determine which of the plurality of ranges the height h of the object belongs to.

Figure 10:
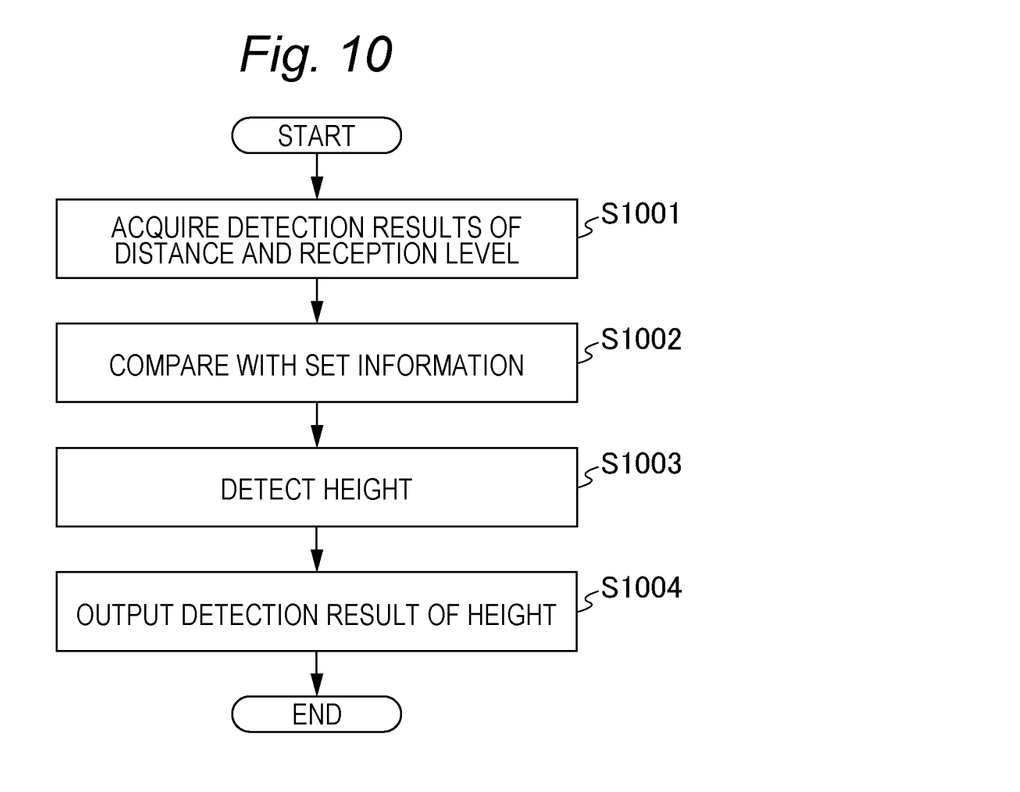
FIG. 10 is an exemplary flowchart showing an example of a process performed in the second embodiment to detect information about the height of the object.

On the basis of the above configuration, in the second embodiment, a process shown in the next FIG. 10 is performed to detect the information about the height h of the object. The series of processes shown in FIG. 10 are repeatedly performed, for example, at a predetermined control cycle.

FIG. 10 is an exemplary flowchart showing an example of a process performed in the second embodiment to detect the information about the height h of the object.

As shown in FIG. 10, in the second embodiment, first in in step S1001, the acquisition processing unit 501 acquires the detection result by the object detection device 200, more specifically, the distance to the object and the detection result of the reception level of the reception wave used to detect the distance.

Then, in step S1002, detection processing unit 512 compares between a relationship between the distance and the reception level acquired in step S1001 and the set information that is previously set. For example, under the example shown in the above-mentioned FIG. 8, a magnitude comparison in the vertical axis direction is performed by the detection processing unit 512 between (i) the solid line L611 representing the relationship between the distance and the reception level acquired in step S1001 and (ii) the dashed-dotted lines L811 to L814 previously set as the set information representing the previously set thresholds Th811 to Th814.

Then, in step S1003, detection processing unit 512 detects the height h of the object on the basis of a result of the comparison in step S1002. For example, in the example shown in the above-mentioned FIG. 8, because the solid line L611 is located between the dashed-dotted lines L812 and L813 in the vertical axis direction, the detection processing unit 513 determines that the height h of the object belongs to the above-mentioned third range corresponding to the dashed-dotted line L813.

Then in step S1004, the detection processing unit 512 outputs the detection result of the height h detected in step S1003 to, for example, the function mounted on the vehicle 1 that handles automatic parking. With this arrangement, the automatic parking of the vehicle 1 is performed in an appropriate aspect, depending on the height h of the object. Then, the process ends.

As described above, in the second embodiment, the detection processing unit 512 detects the information about the height h of the object on the basis of the relationship between the distance and the reception level acquired by the acquisition processing unit 501. With such a configuration, it is possible to detect the information about the height h of the object on the basis of the relationship between the distance to the object and the reception level of the reception wave regardless of a position at which the transmission wave and the reception wave are transmitted and received. This makes it possible to detect the information about the height h of the object without impairing the degree of freedom in designing the vehicle 1.

More specifically, in the second embodiment, the detection processing unit 512 detects the information about the height h of the object on the basis of (i) the relationship between the distance and the reception level acquired by the acquisition processing unit 501 and (ii) the set information that is previously set about the relationship. With such a configuration, it is possible to easily detect the information about the height h of the object by using the relationship between the distance and the reception level acquired by the acquisition processing unit 501 and the set information.

That is, the set information includes a predetermined relationship between distance and reception level that is previously set in correspondence to the value representing the height h of the object. Then, the detection processing unit 512 detects the information about the height h of the object on the basis of a comparison result between (i) the relationship between the distance and the reception level acquired by the acquisition processing unit 501 and (ii) the predetermined relationship. With such a configuration, it is possible to easily detect the information about the height h of the object only by comparing between (i) the relationship between the distance and the reception level acquired by the acquisition processing unit 501 and (ii) the predetermined relationship.

In more detail, the predetermined relationship includes a plurality of relationships that are previously set in correspondence to cases in each of which the value representing the height h of the object belongs to each of a plurality of ranges that are different from each other (see FIG. 9). Then, the detection processing unit 512 detects which of the plurality of ranges the value representing the height h of the object belongs to, on the basis of a comparison result between (i) the relationship between the distance and the reception level acquired by the acquisition processing unit 501 and (ii) the plurality of relationships. With such a configuration, by identifying which of the plurality of ranges the value representing the height h of the object belongs to, it is possible to detect the information about the height h of the object in more detail.

Further, in the second embodiment, similarly to the first embodiment, the distance acquired by the acquisition processing unit 501 can include a plurality of distances to the object detected on the basis of results of substantially simultaneous transmission of a plurality of transmission waves and on reception of a plurality of reception waves that are the plurality of transmission waves having returned upon reflection by the object, and at the same time, the reception level acquired by the acquisition processing unit 501 may include a plurality of reception levels of the plurality of reception waves each used to detect one of the plurality of distances. With such a configuration, by obtaining greater number of detection results, it is possible to obtain in more detail the relationship between the distance to the object and the reception level of the reception wave. This makes it to improve the accuracy of the detection of the information about the height h of the object.

Modified Examples

Note that the above-mentioned first and second embodiments can also be performed in combination. Therefore, in a technique included in the technique of the present disclosure, for example, the information about the height of the object is detected by the technique of the second embodiment before the reception level starts to vary, and the information about the height of the object is detected by the technique of the first embodiment after the reception level starts to vary.

In the above-mentioned first and second embodiments, the technique of the present disclosure is applied to a configuration in which the distance to the object is detected by transmission and reception of ultrasonic waves. However, the technique of the present disclosure can be applied also to a configuration in which the distance to the object is detected by transmission and reception of waves other than ultrasonic waves, such as sound waves, millimeter waves, radar, or electromagnetic waves.

A drive support device that is an example of the present disclosure includes: an acquisition processing unit that acquires (i) a distance to an object detected based on a result of transmission of a transmission wave and reception of a reception wave that is the transmission wave having returned upon reflection by the object and (ii) a reception level of the reception wave used to detect the distance; and a detection processing unit that detects information about a height of the object, based on a relationship between the distance and the reception level that are acquired by the acquisition processing unit.

With the configuration as described above, it is possible to detect the information about the height of the object on the basis of the relationship between the distance to the object and the reception level of the reception wave regardless of a position at which the transmission wave and the reception wave are transmitted or received. This makes it possible to detect the information about the height of the object without impairing the degree of freedom in designing the vehicle.

In the above-mentioned drive support device, the detection processing unit detects the information about the height by using as the relationship a degree of fluctuation, in the reception level, depending on a change in the distance.

With such a configuration, it is possible to easily detect the information about the height on the basis of the degree of fluctuation in the reception level.

In this case, the detection processing unit detects, as the information about the height, a value representing the height, depending on the reception level when the degree of fluctuation in the reception level starts to exceed a threshold in response to a decrease in the distance.

With such a configuration, it is possible to easily detect the value representing the height only by identifying the reception level when the degree of fluctuation in the reception level starts to exceed the threshold.

Further, in the above-mentioned configuration in which the information about the height is detected by using the degree of fluctuation in the reception level, the distance acquired by the acquisition processing unit includes a plurality of distances to the object detected based on results of substantially simultaneous transmission of a plurality of transmission waves and reception of a plurality of reception waves that are the plurality of transmission waves having returned upon reflection by the object, and the reception level acquired by the acquisition processing unit may include a plurality of reception levels of the plurality of reception waves each used to detect one of the plurality of distances. In addition, the detection processing unit uses as the degree of fluctuation a variation with respect to an average value of the plurality of reception levels for each of the plurality of distances.

With such a configuration, by obtaining greater number of detection results, it is possible to obtain in more detail the relationship between the distance to the object and the reception level of the reception wave. This makes it possible to improve the accuracy of the detection of the information about the height can be improve. Further, the variation in the reception level can be easily calculated.

In the above-mentioned drive support device, the detection processing unit detects the information about the height, based on the relationship between the distance and the reception level acquired by the acquisition processing unit and based on set information that is previously set about the relationship.

With such a configuration, it is possible to easily detect the information about the height by using the relationship between the distance and the reception level acquired by the acquisition processing unit and using the set information.

In this case, the set information includes a predetermined relationship between distance and reception level that is previously set in correspondence to the value representing the height, and the detection processing unit detects the information about the height, depending on a comparison result between (i) the relationship between the distance and the reception level acquired by the acquisition processing unit and (ii) the predetermined relationship.

With such a configuration, it is possible to easily detect the information about the height only by comparing between (i) the relationship between the distance and the reception level acquired by the acquisition processing unit and (ii) the predetermined relationship.

Further, in this case, the predetermined relationship includes a plurality of relationships that are previously set in correspondence to cases in each of which the value representing the height belongs to each of a plurality of ranges that are different from each other, and the detection processing unit detects, depending on a comparison result between the relationship between the distance and the reception level acquired by the acquisition processing unit and on the plurality of relationships, which of the plurality of ranges the value representing the height belongs to.

With such a configuration, by identifying which of the plurality of ranges the value representing the height belongs to, it is possible to detect the information about the height in more detail.

Further, in the above-mentioned configuration in which the information about the height is detected based on (i) the relationship between the distance and the reception level and (ii) the set information, the distance acquired by the acquisition processing unit includes a plurality of distances to the object detected based on results of substantially simultaneous transmission of a plurality of transmission waves and based on reception of a plurality of reception waves that are the plurality of transmission waves having returned upon reflection by the object, and the reception level acquired by the acquisition processing unit includes a plurality of reception levels of the plurality of reception waves each used to detect one of the plurality of distances.

With such a configuration, by obtaining greater number of detection results, it is possible to obtain in more detail the relationship between the distance to the object and the reception level of the reception wave. This makes it possible to improve the accuracy of the detection of the information about the height can be improve.

In the above, the embodiments and the modified examples of the present disclosure have been described; however, the above-mentioned embodiments and the modified examples are merely examples and are not intended to limit the scope of the present disclosure. The above-mentioned novel embodiments and the modified examples can be performed in various aspects; and various omissions, replacement, and changes can be made without departing from the gist of the present disclosure. The above-mentioned embodiments and modified examples are included in the scope and gist of the present disclosure and are included in the present disclosure described in the claims and in the scope of equivalents of the claims.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A drive support device comprising:
an acquisition processing unit configured to acquire: a distance to an object detected based on a result of transmission of a transmission wave and reception of a reception wave that is the transmission wave having returned upon reflection by the object; and a reception level of the reception wave used to detect the distance; and
a detection processing unit configured to detect information about a height of the object, based on a correlation between the distance determined using the reception wave and the reception level of the reception wave that are acquired by the acquisition processing unit,
wherein the detection processing unit detects the information about the height by using as the correlation an amount of fluctuation in the reception level over a change in the distance.

2. The drive support device according to claim 1, wherein the detection processing unit detects, as the information about the height, a value representing the height, depending on the reception level when the amount of fluctuation in the reception level starts to exceed a threshold over a decrease in the distance.

3. The drive support device according to claim 1, wherein the distance acquired by the acquisition processing unit includes a plurality of distances to the object detected based on results of substantially simultaneous transmission of a plurality of transmission waves and reception of a plurality of reception waves that are the plurality of transmission waves having returned upon reflection by the object, and the reception level acquired by the acquisition processing unit includes a plurality of reception levels of the plurality of reception waves each used to detect one of the plurality of distances, and
the detection processing unit uses as the amount of fluctuation a variation with respect to an average value of the plurality of reception levels for each of the plurality of distances.

4. The drive support device according to claim 1, wherein the detection processing unit detects the information about the height, based on the relationship between the distance and the reception level acquired by the acquisition processing unit and based on set information that is previously set about the relationship.

5. The drive support device according to claim 4, wherein
the set information includes a predetermined correlation between the distance and the reception level that is previously set in correspondence to a value representing the height, and the detection processing unit detects the information about the height, depending on a comparison result between: the relationship between the distance and the reception level acquired by the acquisition processing unit; and the predetermined correlation.

6. The drive support device according to claim 5, wherein
the predetermined correlation includes a plurality of correlations that are previously set in correspondence to cases in each of which the value representing the height belongs to each of a plurality of ranges that are different from each other, and the detection processing unit detects, depending on a comparison result between the correlation between the distance and the reception level acquired by the acquisition processing unit and on the plurality of relationships, which of the plurality of ranges the value representing the height belongs to.

7. The drive support device according to claim 4, wherein
the distance acquired by the acquisition processing unit includes a plurality of distances to the object detected based on results of substantially simultaneous transmission of a plurality of transmission waves and based on reception of a plurality of reception waves that are the plurality of transmission waves having returned upon reflection by the object, and the reception level acquired by the acquisition processing unit includes a plurality of reception levels of the plurality of reception waves each used to detect one of the plurality of distances.

* * * * *